United States Patent [19]

Coiner, II

[11] Patent Number: 5,223,868
[45] Date of Patent: Jun. 29, 1993

[54] DASHBOARD MOUNTED MICROFICHE READER

[76] Inventor: George Coiner, II, 1021 165 Pl NE, Bellevue, Wash. 98008

[21] Appl. No.: 701,068

[22] Filed: May 16, 1991

[51] Int. Cl.⁵ .............................................. G03B 21/00
[52] U.S. Cl. .................................... 353/13; 353/79; 353/119; 353/DIG. 5
[58] Field of Search ............. 353/12, 13, 11, 27 R, 353/26 R, 43, 79, 98, 119, DIG. 5

[56] References Cited

U.S. PATENT DOCUMENTS

| | | | |
|---|---|---|---|
| 3,951,518 | 4/1976 | Kobayashi et al. | 353/72 |
| 4,170,408 | 10/1979 | Behr | 353/72 |
| 4,302,082 | 11/1981 | Dahinski | 353/27 R |
| 4,312,577 | 4/1982 | Fitzgerald | 353/12 |
| 4,351,592 | 9/1982 | Link et al. | 353/72 |
| 4,504,910 | 3/1985 | Araki et al. | 353/12 |
| 4,618,232 | 10/1986 | Wells | 353/119 |
| 4,810,087 | 3/1989 | Tachibana et al. | 353/119 |
| 5,028,119 | 7/1991 | Hegg et al. | 353/12 |

Primary Examiner—William A. Cuchlinski, Jr.
Assistant Examiner—William C. Dowling

[57] ABSTRACT

A dash mounted microfiche reader and support is provided for attaching a portable microfiche reader to the dashboard of a vehicle. The reader includes an adjustable miniature lens assembly and a mirror unit that swings open for operation. A slide out housing for the reader is pivotally mounted on a leveling tray that is detachably mounted to the dashboard of the vehicle. A microfiche index is used to support the fiche during use.

9 Claims, 7 Drawing Sheets

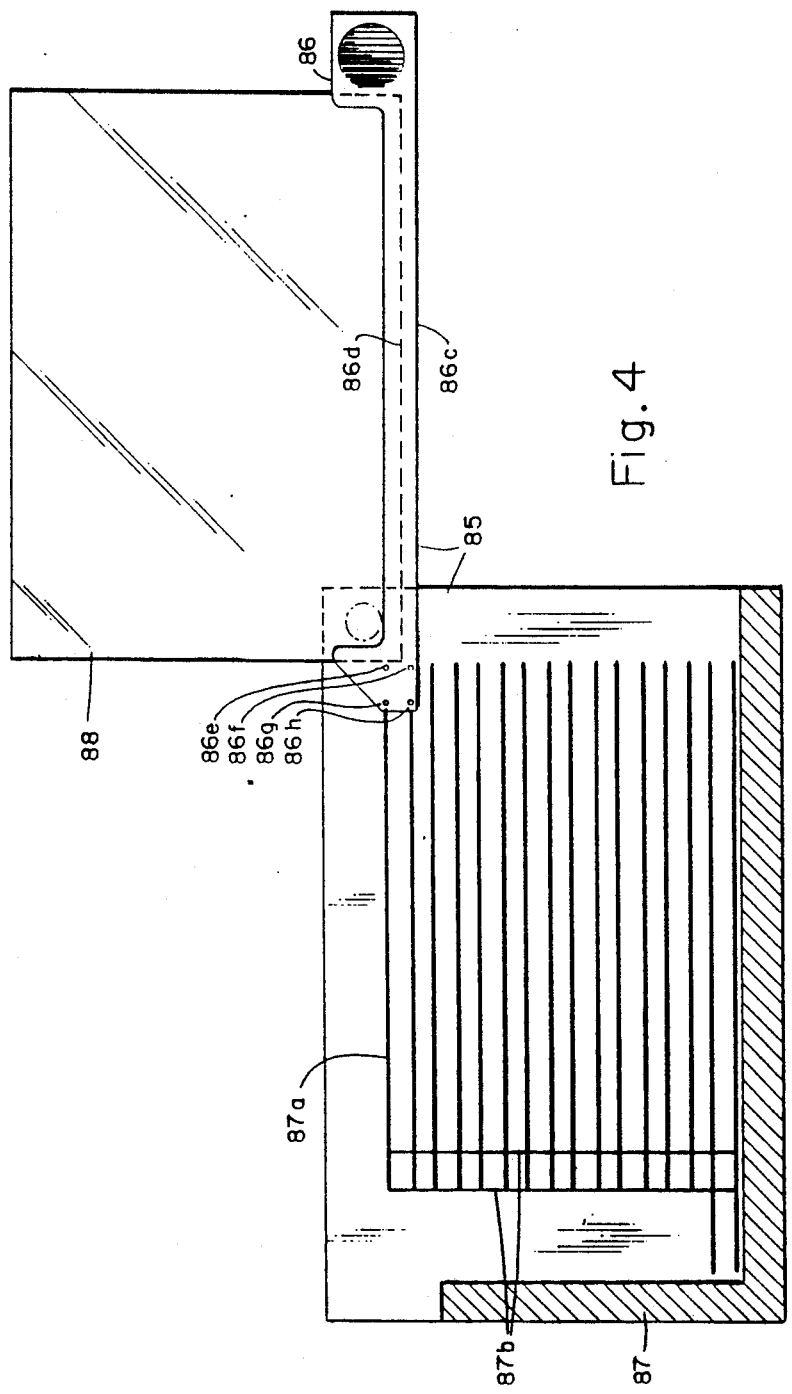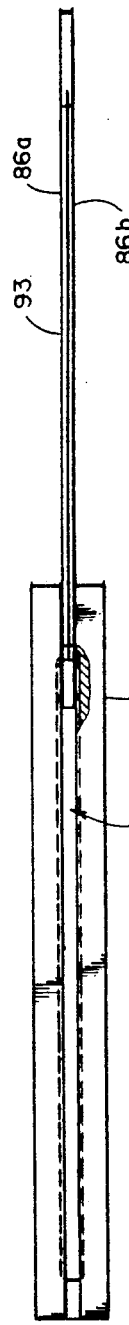

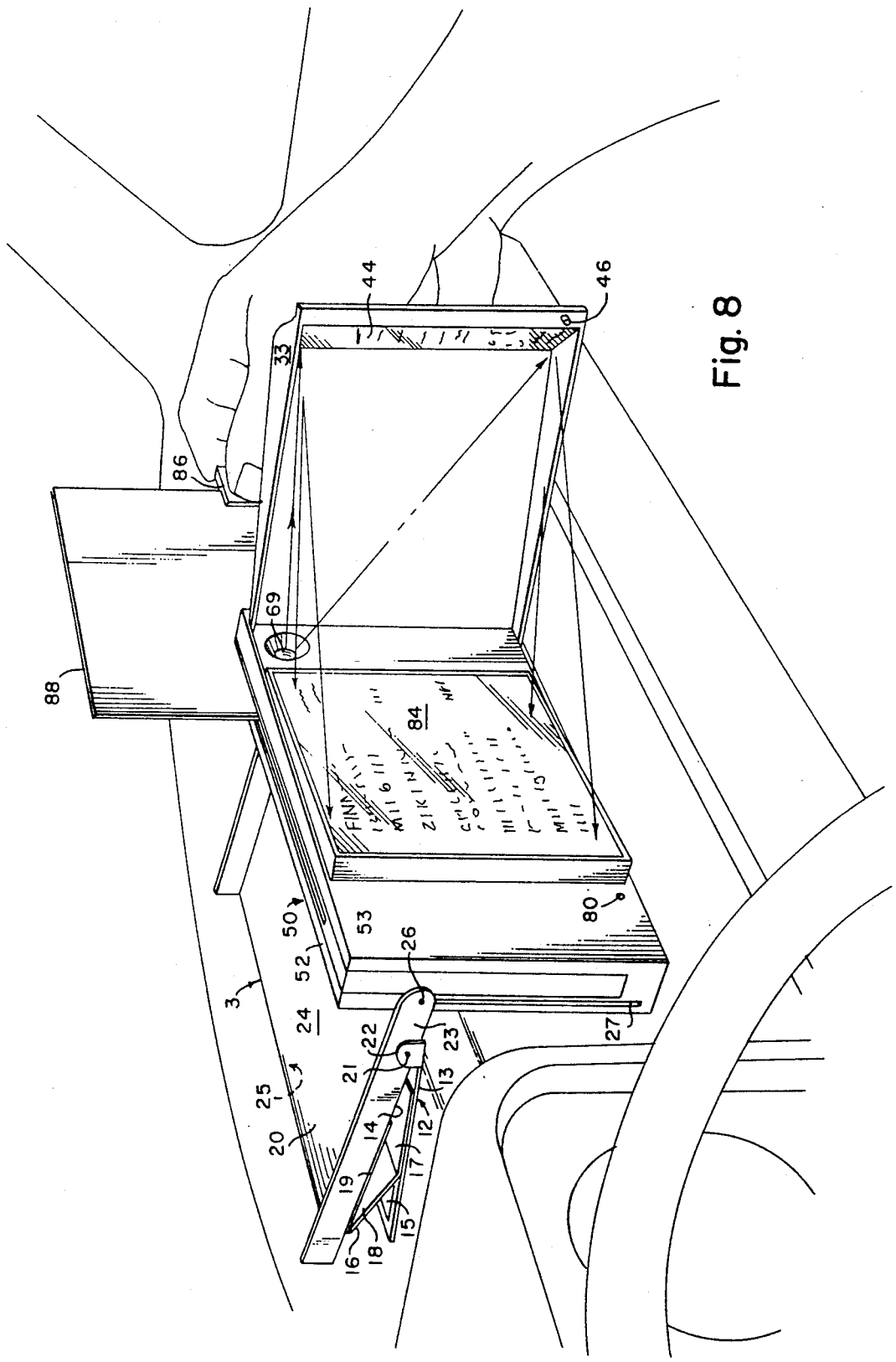

DASHBOARD MOUNTED MICROFICHE READER

BACKGROUND OF THE INVENTION

1. Field of the Invention

This invention relates to microfiche reading equipment specifically for use in motor vehicles. The invention provides quick access to information that recently has become available in microfiche form relating to telephone numbers and addresses for many communities in the United States.

2. Description of the Prior Art

Heretofore, microfiche readers have been developed for various uses in permanent or portable locations. Although some units can be operated in a motor vehicles, no prior art relating to microfiche readers has been developed to provide specific and convenient use in a motor vehicle. U.S. Pat. No. 3,805,429 to Thompson does show a map display device mounted on the steering column of a vehicle but is functionally awkward and optically impractical.

Currently, microfiche readers are available either as large desk top models, medium size brief case enclosed models or hand held models.

While the desk top models such as that disclosed in U.S. Pat. No. 4,094,598 permit easy reading of microfiche information via large screens, the overall size of the unit makes it impractical and inconvenient to use in mobile applications such as motor vehicles. In addition, most units require AC power that is unavailable in a motor vehicle.

The medium size brief case models such as in the Informant II or model Elite II by Anacomp Inc., Atlanta, Ga., permit the user more mobility than the desk units but require an area that is relatively flat and large enough in size to permit opening of the reader and reader housing. Since the viewing screen of the reader is attached to the housing and the screen must be positioned at a minimum distance in order for the operator to be able to clearly see the image, this special requirement may or may not be available within the vehicle. If space is available, the location where the unit may be opened such as a passenger seat, is awkward for a driver to use without changing his seating position. More conveniently, the vehicle driver finds operation of the unit less cumbersome if he moves out of the drivers seat for operation of the viewer.

A hand held microfiche reader is disclosed in U.S. Pat. No. 4,089,593, but the unit requires both hands for operation. In a vehicle, finding an optimum reading position under natural light can be difficult and awkward for the seated driver. If the user attempts to obtain information through the viewer at night or on dark days, he must use batteries that require recharging or replacement at regular intervals. The hand held units can easily be dropped, damaged or lost inside the vehicle. In summary, prior art has not considered a microfiche reader configuration that can be conveniently used by the seated driver of a motor vehicle.

SUMMARY OF THE INVENTION

Accordingly, several objects and advantages that my invention provides over prior art are listed as follows. The reader is intended to provide a convenient means for accessing telephone and other information within a motor vehicle. The reader can be adjusted to an appropriate dash board angle and mounted directly by adhesive onto the dash thereby avoiding the possibility of damage by dropping, an advantage over portable units. Because of its unique pull out, pull down and pull open mechanism, the need for a flat surface to open and operate the reader has been eliminated. An unobvious feature of this particular unit not found in prior art is the location of the viewing screen. This screen is attached directly to the reader with a mirror, providing a means of reflecting the image back onto the reader body. The object of this design configuration is to reduce the distance required from the focusing lens to the viewing screen which provides a size advantage over the "brief case" housed readers. Another object of the unit is to provide the ability of one handed, convenient, operation of the reader while the vehicle is stationary, an advantage over the hand held readers. Since the new reader remains on the dash, power can be conveniently obtained through a cigarette lighter adapter allowing the reader to be operated during dark days or at night without the need for excess power cord necessary in the hand held readers. The reader also includes batteries that are continuously charged thru the cigarette lighter adapter during operation of the vehicle to provide an alternate power source. Another object of this unique design is to enable the reader to be collapsed into a compact box smaller in overall size compared to the medium "brief case" or large sized "desk top" microfiche readers and requiring only a small area on the vehicle dash board for mounting.

BRIEF DESCRIPTION OF THE INVENTION

The microfiche reader is a convenient information access device promoting new use of microfiche telephone and address information within a motor vehicle. The reader and microfiche eliminates the need to transport a full set of yellow and white page telephone books.

BRIEF DESCRIPTION OF DRAWINGS

FIG. 4 is a sectional view of the holder guide and a full plan view of the sheet holder partially inserted in the guide.

FIG. 5 is a top end view of the holder guide and the sheet holder partially inserted in the guide.

FIG. 8 is a plan view of the microfiche reader in operation as viewed by the user.

DETAILED DESCRIPTION OF THE PREFERRED EMBODIMENT

Figure 1:
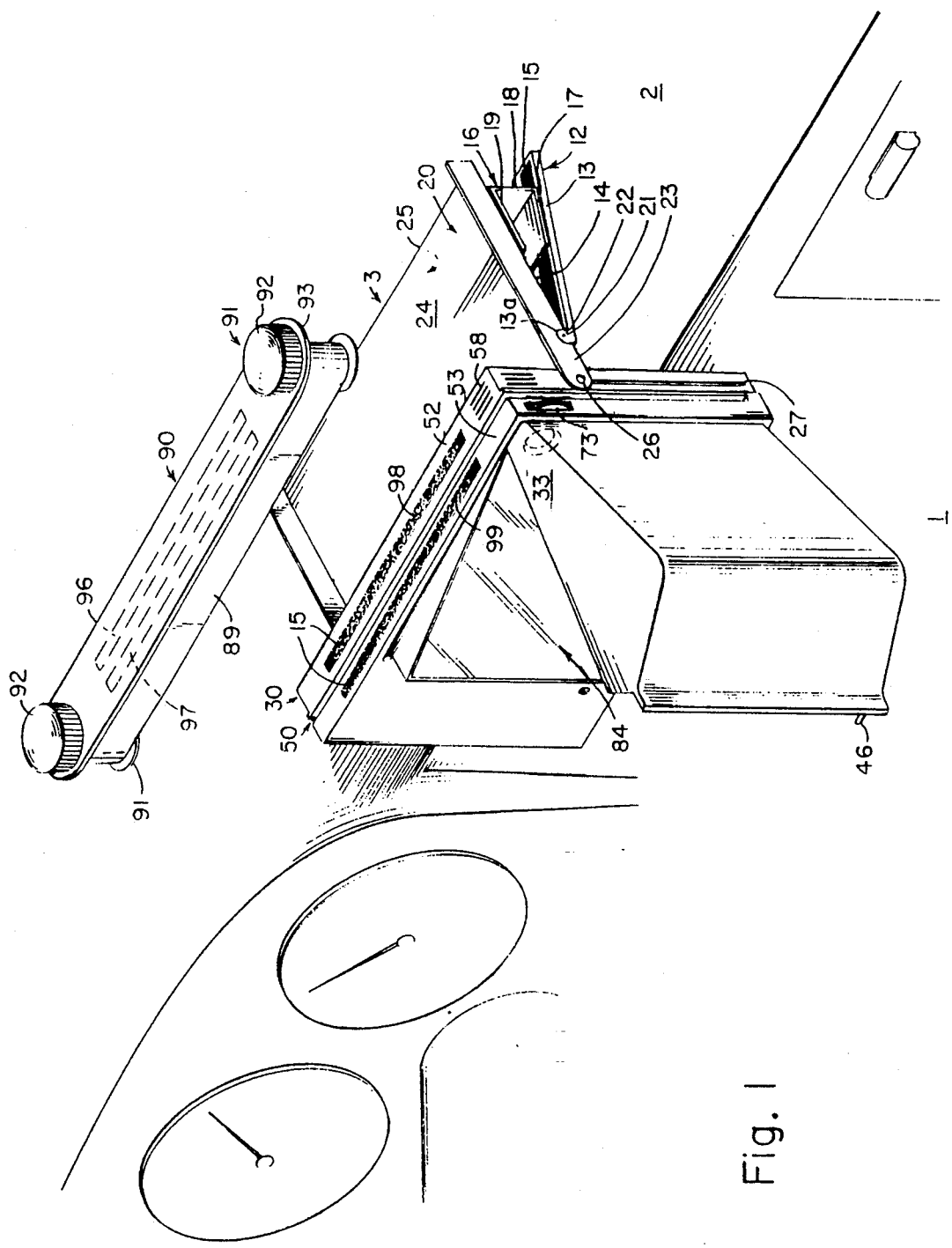
FIG. 1 shows an orthographic view of the microfiche reader mounted on a motor vehicle dash board.

Referring now to the drawings, a dash board mounted microfiche reader (1) is shown in FIG. 1 and is mounted on the dash board (2) of a vehicle by a support unit (3). The support unit may be made of metal or plastic.

The support unit (3) includes a dash stand (12) having a base (13) connected to the dash board. The base may be secured by adhesive, or any type of mechanical fasteners, or by suction cups. The base (13) has an upper surface (14) provided with Velcro fastening material (15). Foot portions (13a), (13b) are provided at forward corners of the base.

The Velcro fastening material (15) is used to connect the base with wedge member (16). The wedge member (16) is formed by a lower horizontal member (17), an upstanding back wall (18), and a slanted wall (19). Velcro is also provided on the bottom surface of member (17) and on the top surface of wall (19). The Velcro material On base (13) mates with the Velcro material on the bottom surface of member (17) to detachably support the wedge at any position on base (13).

The dash stand (12) has a tray (20) pivotally connected to base (13) by pins (21) which are received in aperture (22) of the base. The pins (21) project outwardly from side walls (23) of the tray to fit within the apertures (22). The tray (20) has a top surface (24) that includes a bottom surface (25) also covered with Velcro material. The Velcro material on the bottom surface (25) is used to connect the tray to the top surface of wall (19). Accordingly, base (13), wedge (16) and tray (20) are positionable interfitting parts that support the tray at a predetermined number of angles relative to the plane of the dash board and provide the reader with a leveling support.

As illustrated in FIG. 1, the microfiche reader (1), is pivotally mounted to tray (20) by pins (26) which project inwardly from sidewalls (23) of the tray and are received in slots (27) provided in sidewalls of the reader. The pins are mounted for sliding movement within the slots (27) such that the reader is movable to relative horizontal or vertical positions.

Figure 2:
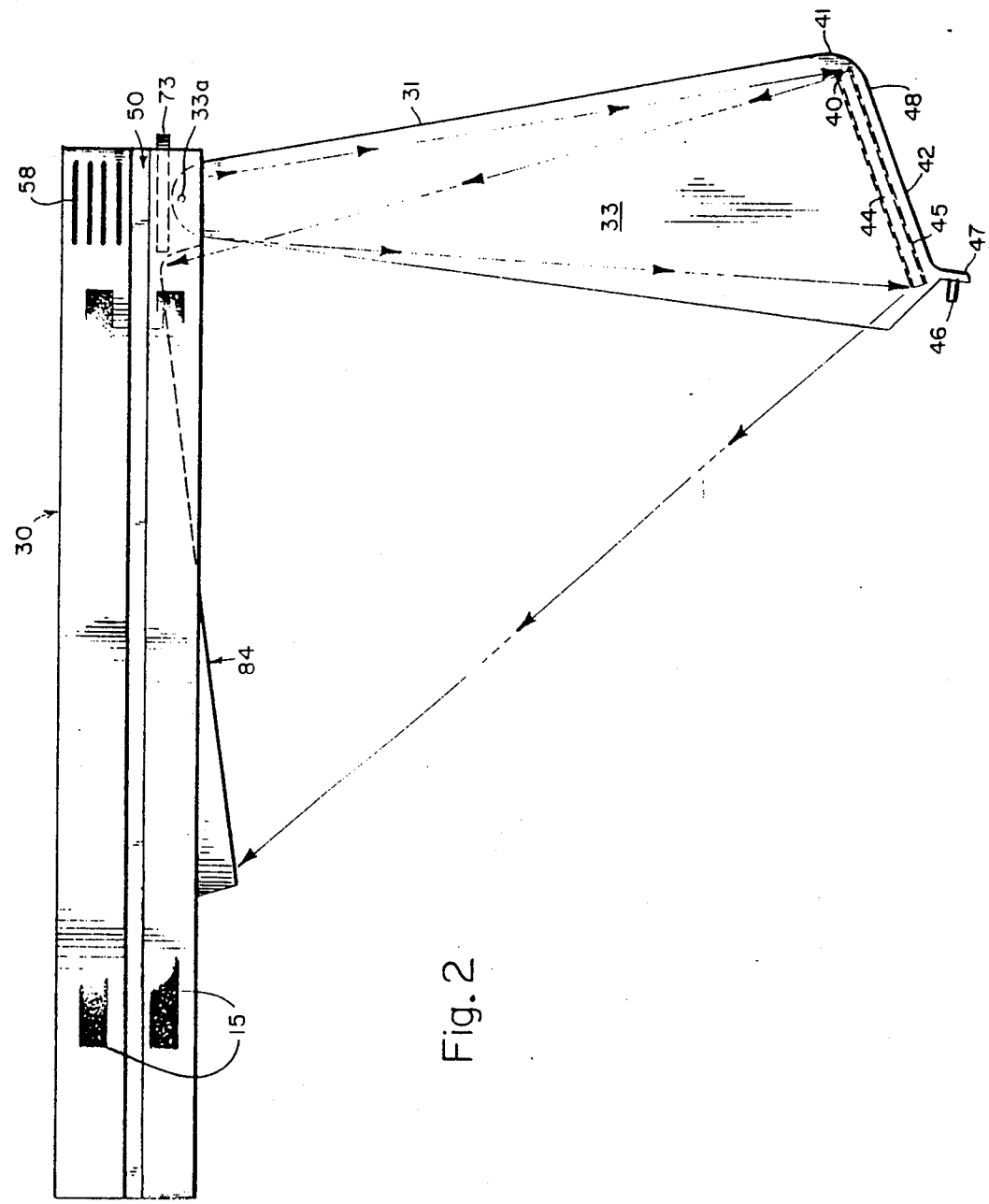
FIG. 2 is a full scale plan sectional view of the microfiche reader with a swing out mirror frame in the open position.
Figure 3:
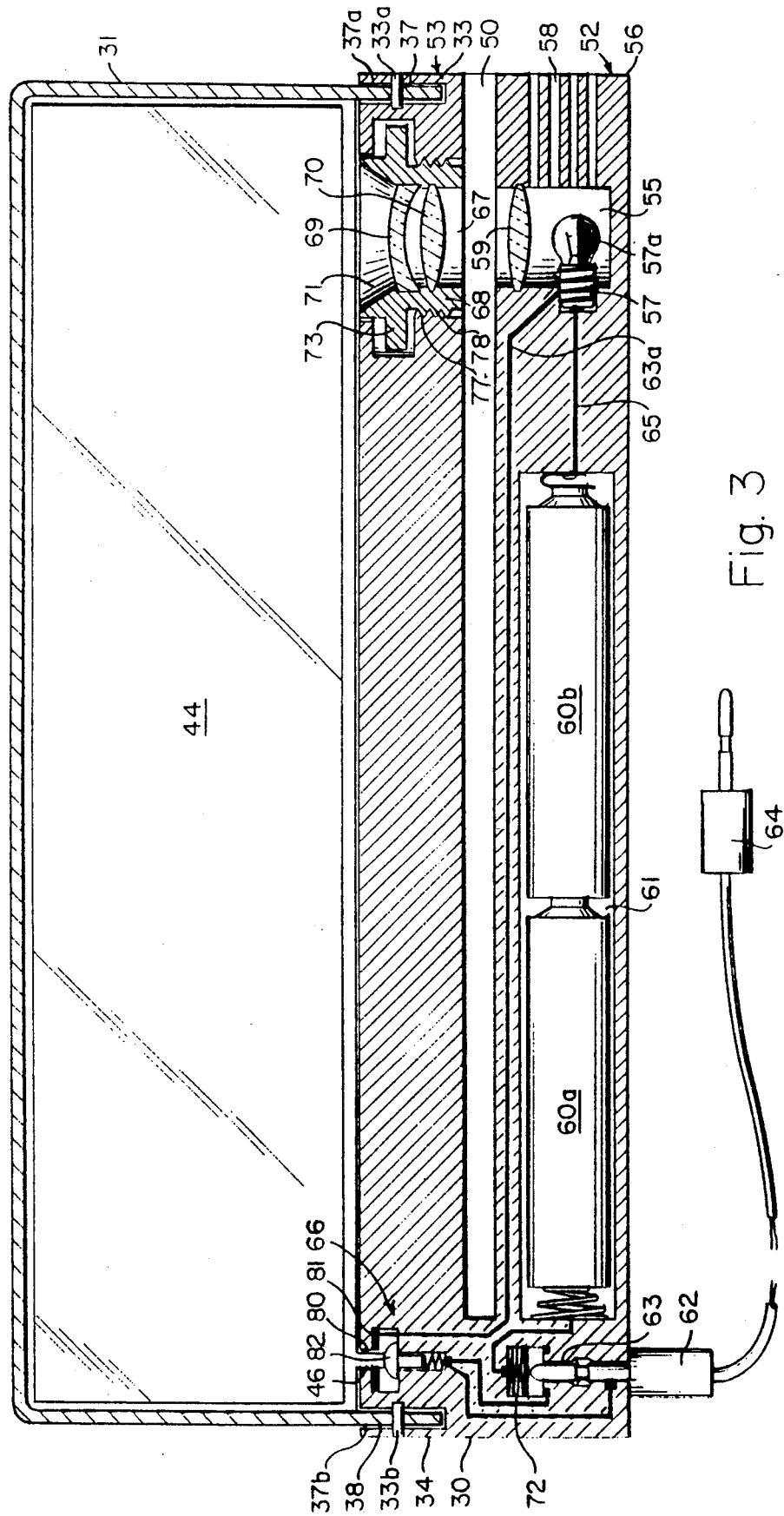
FIG. 3 is a full scale end sectional view of the microfiche reader in its closed (storage) position.

The microfiche reader (1) has a housing (30) as pictured in FIG. 1, 2, & 3. In FIG. 2, the housing (30) includes a swing out mirror frame (31) that is pivotally connected to the housing (30) by pin (33a) mounted inside top wall (33) and bottom wall (34)(not shown). In FIG. 3, pin (33a) projects from surface (37) of wall (33) and is received in aperture (37a) of mirror frame (31). Similarly, pin (33b) projects from surface (38) and is received in aperture (37b) of mirror frame (31). In FIG. 2, the frame (31) has a pocket portion (40) formed by back wall (41) and directive wall (42). The top wall (33) and bottom wall (34) integrally form pocket portion (40). A mirror (44) is mounted on inside surface area (45) of directive wall (42). In FIG. 2, a head member (46) is formed on lip (47) of outside surface (48) of directive wall (42).

Reader housing (30) is made of a thermoset or thermoplastic material. The plastic material is used to absorb the normal shocks while a vehicle is traveling on a roadway. Rough streets can create vibrations that are damaging to a delicate optical system and the plastic material used for the housing will help minimize these damaging effects.

Referring now to FIGS. 1-4, the housing (30) has a reader slot (50), for receiving microfiche film, and as shown in FIG. 3, a lower portion (52) and upper portion (53).

In FIG. 3, lower portion (52) has a tubular orifice (55) in lower right corner area (56). A bulb assembly (57) including a bulb (painted with reflectant on the lower side) (57a) is located within the tubular orifice. Also mounted within orifice (55) and forward of bulb (57a) is a lens (59). This lens acts to condense and distribute light energy evenly to the microfiche. The lens (59) also acts as a heat exchanger to prevent damage of the microfiche. Cooling gaps (58) allow circulation of surrounding air to reduce high temperature from the light energy.

In FIG. 3, the upper portion (53), of housing (30) includes a tubular orifice (67) that is aligned with tubular orifice (55). Mounted within orifice (67) is an optic lens assembly (68) having optic lenses (69) and (70). Upper area (71) of orifice (67) is chamfered to provide a more desirable outlet for light passing through the lens assembly. A focus knob (73) is molded integral with to lens assembly (68).

Again, referring to FIG. 3, the upper portion (53) is further provided with interior threads (77) in housing (30). Lens assembly (68) has exterior threads (78) that mate with threads (77). The turning of the focus knob (73) moves the lens assembly (68) within orifice (67) for focusing the microfiche image onto mirror (44).

In FIG. 3, power means (60) is located within compartment (61) of portion (52) and may include batteries (60a and 60b). Additionally located in lower portion (52) is an electrical male plug (63) that is insertable into channel (63b), connected to contact (62) and extends to a cigarette lighter adapter (64). electrical connections (63c), (63d), (63e), are made within the upper and lower portions to operatively connect the power means to the reader. Power from the vehicle battery passes through the connector to power the bulb and recharge the batteries. The batteries are electrically connected to the bulb through bulb connection (65). Batteries (60a), (60b) and head connector (63a) are electrically connected with a switch assembly (66) mounted within a housing (30). Switch assembly (66) is operably connected to bulb (57a), cigarette lighter adapter (64) and power means (60) through electrical connections (63-66). The switch assembly includes a stationary contact plate (81) and spring 72(a) which biases contact plate (82) that is separately wired one to positive and one to ground source electric power means (60) via electrical spring (72). The switch assembly (66) includes an aperture (80) that receives the head (46) of mirror frame (31) which forces plate (84) downwardly and out of contact with plate (81) when the frame (31) is closed. The head (46) is made of nonconductive material and serves to keep the switch (66) open while securing the frame (31) against upper portion (53). If male plug (63) is removed, electrical spring (72) allows electrical connection of (60a) to (66). The reader is now powered entirely by batteries (60a and 60b) through this connection. Although not shown, a cigarette lighter adapter may be used in place of the batteries.

In FIG. 1, upper portion (53) supports a silver colored screen (84) for reviewing an image from lens assembly (68). The screen is secured within the upper portion (53) by conventional means and has an angled position as shown in FIG. 2 to improve image clarity.

In FIG. 4, microfiche indexer (85) includes a sheet holder (86) and a square holder guide (87). In FIGS. 4 and 5, the sheet holder (86) has side support walls (86a, and 86b), bottom support (86c), slot form (86d) and holder pins (86e, 86f, 86g, 86h). A microfiche sheet (88) is inserted in slot form (86d) and is supported by sheet holder walls (86a and 86b) and bottom support (86c). The square holder guide (87) includes horizontal and vertical slots (87a, 87b). Sheet holder pins (86e, 86f, 86g, 86h) of sheet holder (86), can be moved in slots (87a and 87b) of guide (87) to allow positioning of the sheet holder (86) in a horizontal or vertical direction.

Figure 6:
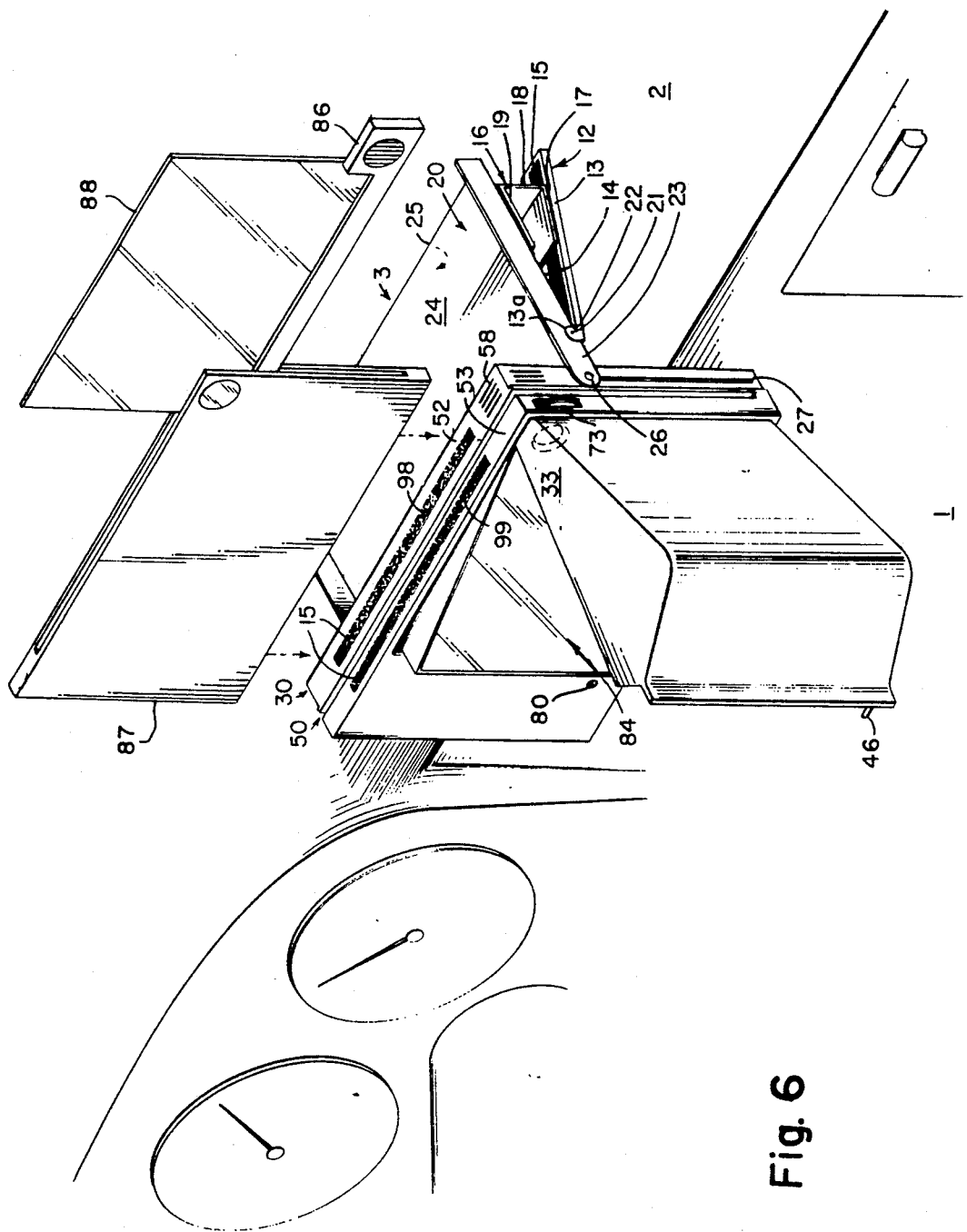
FIG. 6 is a plan view of the microfiche reader, holder guide and sheet holder.
Figure 7:
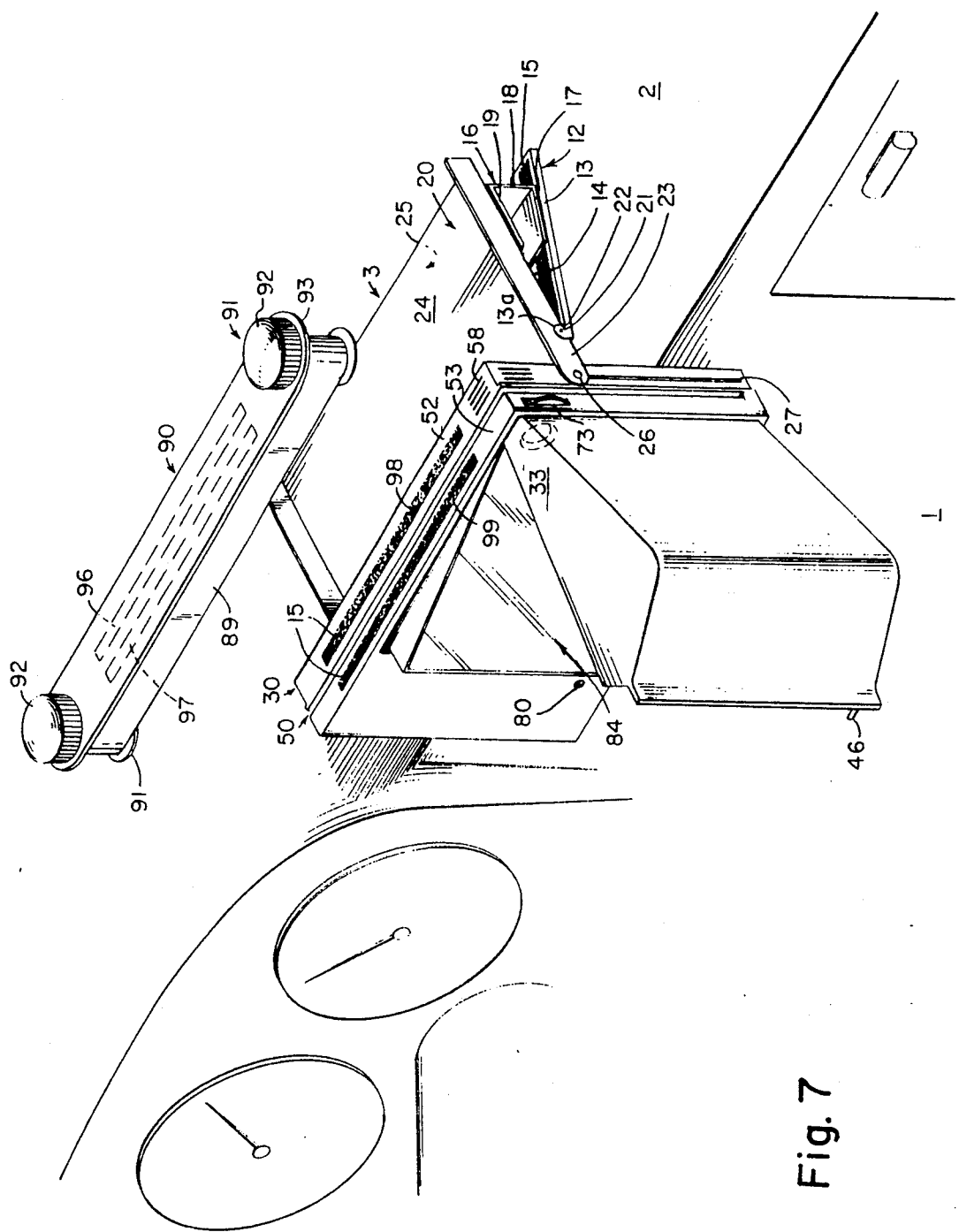
FIG. 7 is a plan view of the microfiche reader and roll film adapter.

In FIGS. 6-8, the indexer (85) is inserted into a fixed position in reader slot (50). The microfiche sheet (88) can now be moved in a supported vertical or horizontal position to enable magnification of a specific portion directly in front of lens (59).

Optionally, and shown in FIG. 7, the reader (1) may receive a roll film adapter (90) for viewing microfiche in roll film format (89). The roll film adapter has roll reels (91) with control knobs (92) and a support plate (93). The support plate has a underside surface (96 and 97) covered with Velcro for connecting with Velcro strips on side surfaces (98, 99) of portions (52 and 53) The roll reels are turned to slide the film in the path of the light for viewing.

In operation, when a user decides to pull the reader from storage, the reader is pulled horizontally away from the dash and pivoted downwardly until the reader is perpendicular to the base. The angle of the tray and vertical plate of the reader is then adjustable by moving the wedge to the desired position. The frame is then opened and the power means illuminates the bulb. The indexer with the microfiche is next slid into the unit for viewing information. The image is adjustable by the focus knob for the sharpest image.

Turning to FIG. 8, light generated from the bulb passes through a lens then through the microfiche sheet held in the form that has been placed in the indexer slot. The light illuminates the information which is magnified through optic lens assembly. The light leaves the lens and reaches the mirror approximately 5 inches away. After being reflected off the mirror, the image is displayed back onto the reader housing at an average distance of 6 inches away onto the angled, small silver colored screen. By incorporating the mirror and creating a reverse direction image, the minimum distance required of the microfiche unit is achieved by allowing the unit to remain compact. After use, the indexer is removed for changing the microfiche and the indexer reinserted into the slot. The reader is then pivoted upwardly and slid back into storage position.

I claim:

1. A microfiche reader assembly mountable to the dash board of a vehicle, comprising;
    a microfiche housing, said housing having sidewalls with elongated slots,
    a base means secured to the dashboard of a vehicle, said base means having attachment means for adjustable securing said microfiche housing to said base means,
    a support stand, said support stand having pin means for pivotally and slidably connecting said microfiche housing to said support stand, said microfiche housing slidably mounted for support in an operative and inoperative position.

2. The microfiche reader assembly of claim 1, further comprising a viewing screen adjustably supported by said microfiche assembly.

3. The microfiche reader assembly of claim 2, further comprising closure means pivotally mounted on said microfiche housing.

4. The microfiche reader assembly of claim 3, further comprising mirror means mounted on said closure means for reflecting light projected from said microfiche housing.

5. A microfiche reader assembly mountable to the dash board of a vehicle, comprising;
    a microfiche housing, said housing having sidewalls with elongated slots,
    a base means secured to the dashboard of a vehicle, said base means having attachment means for adjustably securing said microfiche housing to said base means,
    a support stand, said support stand having pin means for pivotally and slidably connecting said microfiche housing to said support stand, said microfiche housing slidably mounted for support in an operative and inoperative position,
    a viewing screen adjustably supported by said microfiche assembly,
    closure means pivotally mounted on said microfiche housing,
    mirror means mounted on said closure means for reflecting light projected from said microfiche housing, and
    locking means mounted on said closure means for locking said closure means in a closed position.

6. A microfiche reader assembly mountable to the dash board of a vehicle, comprising;
    an adjustable support stand,
    a microfiche reader housing movably mounted to said adjustable support stand,
    a base means secured to the dashboard of a vehicle, said base means having attachment means for adjustably securing said microfiche housing to said base means,
    a lens assembly mounted within said microfiche reader housing,
    a movable mirror means pivotally movable into operable position and connected to said microfiche reader housing,
    a screen means for receiving an image from said lens assembly,
    said lens assembly and said screen supported in said reader housing, and
    power means for operating said lens assembly to project an image onto said screen when said mirror is pivotally moved into operable position.

7. The microfiche reader assembly of claim 6, further comprising attachment means mounted on said adjustable support stand for detachably adjusting said microfiche reader housing.

8. The microfiche reader assembly of claim 6, said power means comprising rechargeable batteries.

9. The microfiche reader assembly of claim 8, said assembly slidably movable to rest on said base means during non-use.

* * * * *